United States Patent [19]

Garrison

[11] 4,195,710

[45] Apr. 1, 1980

[54] OIL DRAIN SYSTEM

[76] Inventor: Ward S. Garrison, P.O. Box 1773, Sedona, Ariz. 86336

[21] Appl. No.: 947,260

[22] Filed: Sep. 29, 1978

[51] Int. Cl.² .................... F16N 33/00; B65B 3/06
[52] U.S. Cl. .................................. 184/1.5; 141/338; 220/1 C
[58] Field of Search ............. 184/1.5, 106; 141/337, 141/338; 206/223; 220/1 C

[56] References Cited

U.S. PATENT DOCUMENTS

| | | | |
|---|---|---|---|
| 1,242,453 | 10/1917 | Lester | 141/338 |
| 1,256,961 | 2/1918 | Welsh | 141/338 X |
| 1,408,865 | 3/1922 | Cowell | 141/338 |
| 1,461,654 | 7/1923 | Haessler | 141/338 |
| 1,802,426 | 4/1931 | Hoyt | 220/1 C |
| 2,833,375 | 5/1958 | Lundelius | 184/106 |
| 3,410,438 | 11/1968 | Bartz | 220/1 C |
| 4,010,863 | 3/1977 | Ebel | 220/1 C |
| 4,054,184 | 10/1977 | Marcinko | 184/1.5 |
| 4,098,398 | 7/1978 | Meyers | 184/1.5 |
| 4,099,598 | 7/1978 | Clinard | 184/106 |

FOREIGN PATENT DOCUMENTS

| | | | |
|---|---|---|---|
| 2351932 | 4/1975 | Fed. Rep. of Germany | 184/106 |
| 619539 | 1/1927 | France | 141/338 |
| 1416096 | 12/1975 | United Kingdom | 206/223 |

*Primary Examiner*—David H. Brown
*Attorney, Agent, or Firm*—Fishburn, Gold & Litman

[57] ABSTRACT

An oil drain system having a collection receptacle that is generally rectangular with a fill spout adjacent one end. A funnel member is pivotally mounted on the receptacle and consists of a frame with a removable flexible sheet secured thereto to extend at an incline upwardly and outwardly from the fill spout end of the receptacle with the adjacent end of the sheet extending into the fill spout and gripped therein by a movable retainer. The receptacle is of low height so that the funnel member and receptacle may be positioned under the vehicle motor to receive oil drained therefrom. The flexible sheet and securement thereof to the fill spout provides a trough for flow of oil to the receptacle and the retainer has a portion forming an open obstruction to stop plugs or like objects while permitting oil to pass therethrough. A brace member is detachably connected to the receptacle to hold the funnel member in inclined relation. After use the flexible member is disconnected from the fill spout and the funnel member folded to overlying position relative to the receptacle. A closure is then applied to the fill spout. A handle is arranged on the end adjacent the fill spout and when not in use the receptacle may stand on the other end for storage.

10 Claims, 8 Drawing Figures

U.S. Patent Apr. 1, 1980 Sheet 1 of 2 4,195,710
Fig. 1.
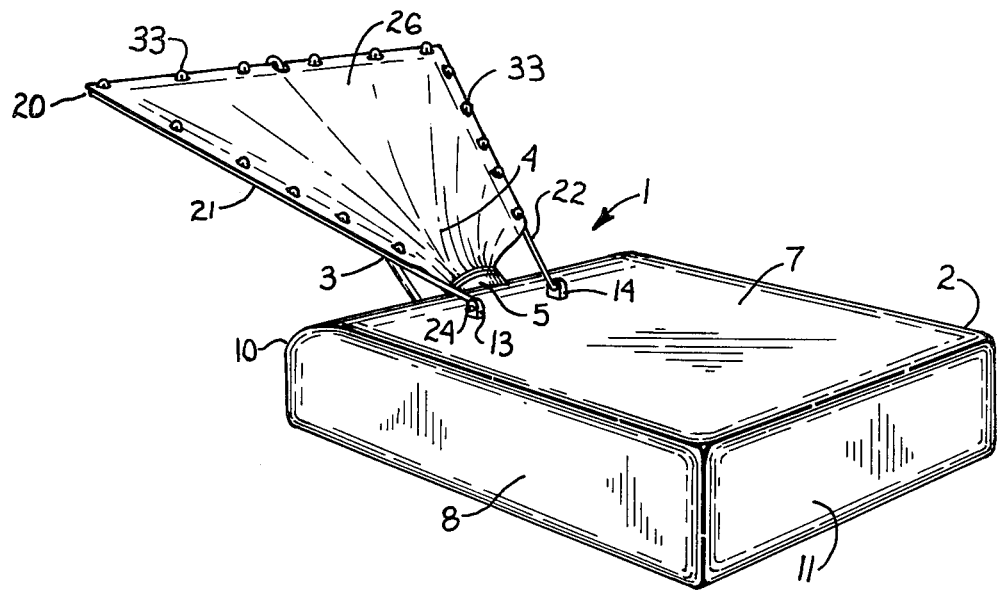
Fig. 2.
Fig. 3.
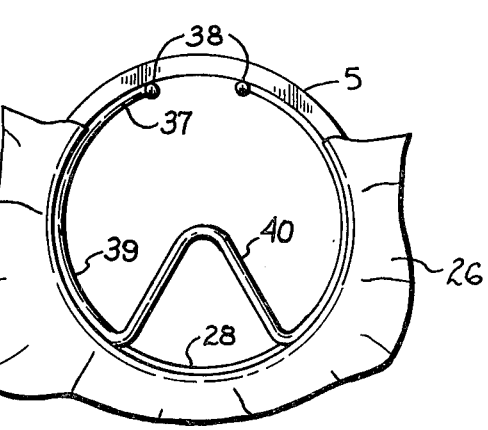
Fig. 4.
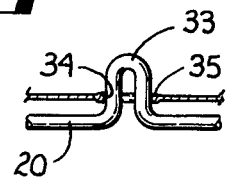

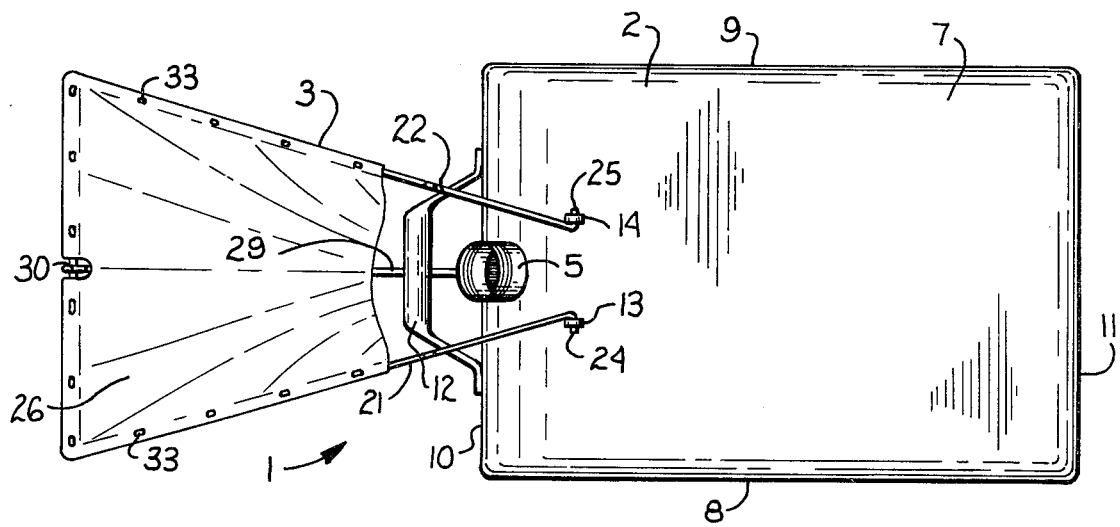
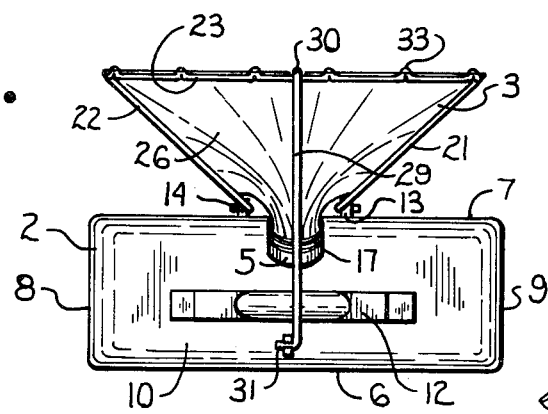
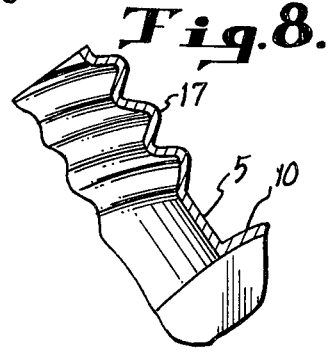
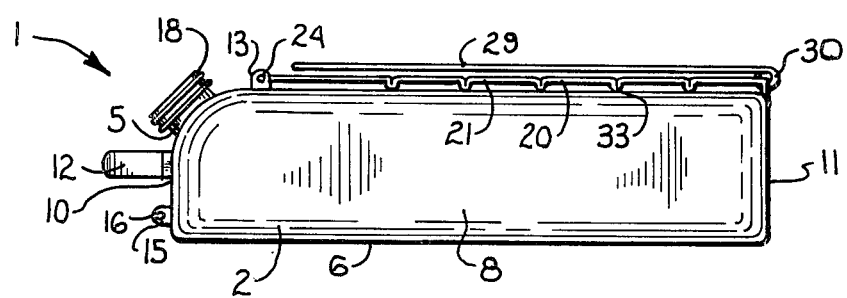

OIL DRAIN SYSTEM

The present invention relates to oil drain systems for use in receiving and containing oil drained from a motor vehicle and particularly to a system for do-it-yourself servicing of the vehicle.

In the past it was common practice to have oil changed in motor vehicles at service stations. However, the practice is changing due to service stations being replaced by "no service" gasoline stations with the result that more and more vehicle owners are servicing their own vehicles including changing of the oil in the engines thereof. Due to the low height under the vehicle the draining of the oil has presented problems in catching all of the oil without spills and in the disposing of the oil drainage.

The principal objects of the present invention are to provide an oil drain system that eliminates the problems heretofore experienced by the do-it-yourself person in the draining and handling of the oil; to provide such a system that is of low height to be conveniently inserted under the vehicle motor; to provide such a system with a receptacle having a fill spout and a funnel member mounted on the receptacle and connectible with the spout to provide for flow of oil received into the receptacle; to provide such a structure wherein the funnel member includes a frame and a flexible sheet removably mounted thereon, the funnel member being arranged for folding into overlying relation to the receptacle when not in use; to provide such a receptacle and structure that may be positioned on end for small space storage requirements; to provide such an oil drain system that may be easily and quickly erected and placed in position under a vehicle with a funnel sheet retainer having an open obstruction to catch the drain plug, if dropped in removing from the engine crankcase, and prevent same from entering the receptacle; to provide such an oil drain system that is economical to manufacture, durable in construction, positive in operation and which is particularly well adapted for its intended purpose.

Other objects and advantages of this invention will become apparent from the description taken in connection with the accompanying drawings wherein are set forth by way of illustration and example certain embodiments of this invention.

The drawings constitute a part of this specification including exemplary embodiment of the present invention and illustrate various objects and features of the oil drain system.

FIG. 1 is a perspective view of the oil drain system receptacle and funnel erected for oil receiving position.

FIG. 2 is a side elevational view of the receptacle and funnel in the erected position.

FIG. 3 is an enlarged partial view looking into the fill spout and illustrating the retainer securing the funnel sheet in said spout.

FIG. 4 is an enlarged partial sectional view through an aperture in the funnel sheet engaged on a projection of the funnel frame.

FIG. 5 is a top view of the funnel and receptacle.

FIG. 6 is an end view of the funnel and receptacle taken from the funnel end.

FIG. 7 is a side elevational view with funnel in folded position overlying the receptacle.

FIG. 8 is an enlarged sectional view through a portion of the fill spout.

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

The reference numeral one generally designates an oil drain system which includes a receptacle 2 and funnel structure 3 arranged in such a manner whereby the funnel member extends upwardly and outwardly in inclined relation to the receptacle to define a trough shaped portion 4 that discharges into a fill spout 5 of the receptacle. The receptacle and funnel member are of low height whereby it may be erected as illustrated in FIGS. 1 and 2 and then moved under the vehicle to position the funnel member under the drain opening of the vehicle motor crankcase.

The receptacle 2 is preferably generally rectangular shaped for large capacity and low height. The receptacle may be made of any suitable material and is preferably of suitable plastic with a bottom 6, top 7, side walls 8 and 9 and end walls 10 and 11. It is preferred that the connection between the end wall 10 and top wall 7 be inclined or rounded with the fill spout 5 positioned therein whereby the fill spout is inclined upwardly for facilitating flow of oil therein. In the illustrated structure, a suitable carrying handle 12 is secured to the end wall 10 and the end 11 is flat whereby the receptacle may be positioned to stand on the end 11 as when in storage so as to require little storage area. In the illustrated structure, the receptacle has laterally spaced lugs 13 and 14 arranged in upstanding relation of the top walls 7 adjacent the fill spout 5 for purposes later described. There is a lug 15 centrally located and adjacent the bottom of the end wall 10, said lug having a notch 16 therein for purposes later described. In the illustrated structure, the fill spout 5 is a generally cylindrically tubular member provided with a plurality of ribs or grooves 17 for engagement by corresponding elements of a closure cap 18 whereby the cap can be secured onto the fill spout to close same when the receptacle is not in use or in storage.

The funnel member is a structure of large area to eliminate the necessity of accurate positioning under the drain of the engine crankcase and to also catch all of the oil from a drain stream even though partially deflected as the plug is removed from the drain opening. In the illustrated structure, the funnel member 3 includes a frame 20 formed of wire or the like and having side members 21 and 22 connected by an end member 23 whereby the side members 21 and 22 converge toward the receptacle with free ends bent to form outwardly extending trunnions 24 that extend through apertures 25 in the ears 13 and 14. With this arrangement the frame may be easily detached from the receptacle by squeezing the side members 21 and 22 to withdraw the trunnions 24 from the apertures 25. An imprevious flexible sheet 26 is secured to the frame whereby the center portion is loose or sags and the end portion 28 extends into the inside of the spout 5 and is secured therein so that the funnel member when erected and inclined as illustrated in FIGS. 1 and 2 the flexible member forms a trough 4 for flow of oil into the receptacle. The frame is held in erected position inclined relative to the receptacle by means of a brace 29 having one end pivotally mounted as of 30 on the frame member 23 with the other end of the brace turned laterally to form a finger 31 that engages in the notch 16 of the ear 15.

The funnel sheet 26 is suitably attached at one end and at the side margins to the frame end member 23 and side members 21 and 22. Any suitable fastener structure could be utilized, however, it is preferred that the sheet be separable from the frame. The sheet may be any suitable imprevious material, however, it is preferred that it be a sheet of heavy plastic as for example a sheet having a thickness of 4 to 8 mils so as to be durable and resistant to tearing. In the structure illustrated the cooperating fastening means on the frame and sheet consist of the plurality of upstanding projections 33 spaced along the sides 21 and 22 of the frame and the end member 23 of the frame. The sheet 26 has a plurality of spaced apertures 34 arranged along the margins with the spacing corresponding to the spacing of the projections of the frame members. It is preferred that the apertures 34 be encircled with a bead like formation 35 to reinforce the edges of the aperture and resist tearing. The apertures 34 are of a size to fit snugly over the projections 33 creating friction that retains a sheet thereon until forcably removed. The projections may be any suitable form, however, in the structure illustrated the frame is formed of wire and each of the projections 33 is a U-shaped bend in said wire as illustrated in FIG. 4. With this mounting of the sheet onto the frame the end portion of the sheet adjacent the spout may be inserted therein and removably secured in any suitable manner. In the structure illustrated, a spring type retainer 37 has free ends 38 which are squeezed together to reduce the diameter of the retainer ring 39 so it may be moved inside of the portion of the sheet extending into the interior of the spout. When positioned in the spout the ends 38 of the retainer are released allowing the retainer to expand and grip the sheet between the retainer spring ring 39 and the inside surface of the spout. In the structure illustrated, the midportion of the retainer has an inverted V-shape bend 40 forming an open obstruction that permits the flow of oil thereby and that will stop movement of objects such as the drain plug or the like to prevent same from passing into the receptacle.

For storage of the funnel end receptacle, the retainer 37 is removed and the end of the sheet 26 withdrawn from the fill spout. The closure cap 18 is then applied to the spout 5. The finger 31 on the brace rod 29 is removed from the notch 16 and the funnel structure is swung on the trunions 24 to a position overlying the top of the receptacle. If desired, the projections 33 on the end member 23 may engage over the end of the wall 11 to aid in holding the funnel structure in position on the top wall 7. The structure may then be lifted by a handle 12 and stood on the end 11 or otherwise moved and stored as desired.

In use the receptacle and funnel structure is removed from storage and the receptacle laid on the bottom 6 at the side of a vehicle. The funnel structure is then swung upwardly and beyond the end 10 and the brace rod finger 31 engaged in the notch 16 to hold the funnel frame in the proper inclined position. The end portion of the sheet is then inserted into the opening in the tubular fill spout 5 and the retainer 39 squeezed and inserted therein and released to hold the sheet secured in the fill spout. The structure is then ready for use and is moved under the vehicle to position the funnel member under the drain opening of the crankcase. The drain plug is then removed and if dropped it will move down the sheet to the retainer 39 where it is stopped permitting the oil to pass thereby into the receptacle. When the draining is completed the receptacle and funnel member may be removed from under the vehicle and the sheet disconnected from the fill spout, the closure 18 applied and then the funnel member may be swung to overlying position for storage.

It is to be understood that while certain forms of this invention have been illustrated and described, it is not to be limited to the specific form or arrangement of parts herein described and shown except insofar as such limitations are included in the following claims.

What is claimed and desired to secure by Letters Patent is:

1. An oil drain system for use in receiving and containing oil drained from a motor vehicle comprising:
   (a) a collection receptacle having integral top wall, bottom wall, side walls and end walls defining an elongate chamber, said receptacle being of a shape and size that the receptacle may selectively rest on each of the bottom and one end wall with carrying handle means in the other end wall, said other end wall having a portion inclined toward the top wall;
   (b) said receptacle having a tubular member in said inclined portion defining a fill opening therefor; and having ribs extending generally circumferentially thereof;
   (c) a closure cap for said fill opening and having ribs extending generally circumferentially thereof for removably engaging said ribs of the tubular member;
   (d) a funnel member hingedly connected to the receptacle top wall adjacent said other end wall and selectively movable to overlie said top wall; and to extend outwardly and upwardly relative to said other end wall and positionable under a drain opening of a motor crankcase;
   (e) said funnel member having a frame including side members and an end member remote from said tubular member;
   (f) a flexible member having edges connected to the frame side and end members and an end adjacent the tubular member having a connection to extend into said tubular member;
   (g) a brace member between said frame end member and the receptacle to position said frame member at a level above the tubular member for flow of material caught by the flexible member into the receptacle.

2. An oil drain system as set forth in claim 1 wherein:
   (a) said funnel side members converge toward the receptacle and said other end of the flexible sheet member extends into the tubular member providing a trough for flow of oil to the receptacle;
   (b) resilient means is removably mounted inside of the other end of said flexible sheet and expands to grip said sheet between the tubular member and resilient means.

3. An oil drain system as set forth in claim 2 wherein:
   (a) the resilient means is a wire retainer with a portion extending inwardly and providing an open obstruction to stop plugs and like objects and permit passage of oil to the receptacle;
   (b) said resilient means and other end of said flexible sheet being removable from said fill spout.

4. An oil drain system for use in receiving and containing oil drained from a motor vehicle comprising:
   (a) a collection receptacle having integral top wall, bottom wall, side walls and end walls defining an elongate chamber, said receptacle being of a shape and size that the receptacle may selectively rest on each of the bottom and one end wall;
   (b) said receptacle having a tubular member at the other end wall defining a fill opening therefor;
   (c) a closure cap removably mounted on said tubular member for closing said fill opening;
   (d) a funnel member connected to the receptacle said one end wall and selectively movable to extend outwardly and upwardly relative to said other end wall and positionable under a drain opening of a motor crankcase;
   (e) said funnel member having a frame including side members and an end member remote from said tubular member;
   (f) a flexible member having edges connected to the frame side and end members and an end adjacent the tubular member extending into said tubular member providing a trough for flow of oil to the receptacle;
   (g) means connected between said frame member and the receptacle to position said frame member at a level above the tubular member for flow of oil caught by the flexible member into the receptacle.

5. An oil drain system as set forth in claim 4 wherein:
   (a) said funnel side members converge toward the receptacle and said other end of the flexible sheet member extends into the fill spout to provide the trough for flow of oil to the receptacle;
   (b) resilient means is removably mounted at the other end of said flexible sheet and expands to grip said sheet between the fill spout and resilient means.

6. An oil drain system as set forth in claim 5 wherein the means connected between the frame member and the receptacle to position the frame member at a level above the tubular member includes:
   (a) cooperating means on the receptacle and frame side members hingedly mounting the frame on the receptacle for movement of the funnel member into overlying position on the receptacle;
   (b) a brace member pivoted on the frame end member and engageable with the receptacle below the fill spout to hold the funnel member in oil receiving position extending in inclined upwardly and outwardly relation to said receptacle.

7. An oil drain system as set forth in claim 6 including:
   (a) a plurality of spaced apart upstanding projections along the frame side and end members;
   (b) a plurality of spaced apart apertures along the margins at the sides and said one end of the flexible sheet for receiving respective frame projections to removably mount the sheet on the frame of the funnel member.

8. An oil drain system as set forth in claim 7 wherein:
   (a) the frame is metal wire and the projections are U-shaped bends therein;
   (b) the flexible sheet is impervious plastic of 4 to 8 mils thickness;
   (c) the apertures in said flexible sheet are surrounded by an increased thickness bead-like reinforcement.

9. An oil drain system as set forth in claim 6 wherein:
   (a) a carrying handle on said one end wall of said receptacle adjacent to and below said tubular member when the receptacle is in oil receiving position;
   (b) said cooperating means include laterally spaced ears upstanding on the receptacle and trunnions on ends of the frame side members.

10. An oil drain system as set forth in claim 9 wherein:
    (a) said ears are on the receptacle top wall adjacent the fill spout;
    (b) the funnel member when in overlying relation to the receptacle substantially engages said top wall and is of a length that permits the receptacle to be moved to stand on the other end thereof.

* * * * *